United States Patent
Suchowski et al.

[19]

[11] Patent Number: 5,965,016
[45] Date of Patent: *Oct. 12, 1999

[54] FLUIDIZED BED AQUARIUM FILTRATION SYSTEM

[75] Inventors: Bernard Suchowski, Marlboro, N.J.; Joseph E. Gargas, Appollo Beach; Robert H. Hyde, Riverview, both of Fla.; Joseph Pluchino, Paterson, N.J.

[73] Assignee: The Hartz Mountain Corporation, Secaucus, N.J.

[ * ] Notice: This patent is subject to a terminal disclaimer.

[21] Appl. No.: 08/943,922

[22] Filed: Oct. 3, 1997

Related U.S. Application Data

[63] Continuation-in-part of application No. 08/800,912, Feb. 13, 1997, Pat. No. 5,746,921, and a division of application No. 08/481,729, Jun. 7, 1995, Pat. No. 5,632,887.

[51] Int. Cl.$^6$ .............................. C02F 3/06; A01K 63/04
[52] U.S. Cl. ......................... 210/169; 210/266; 210/284; 210/416.2; 210/290; 119/260
[58] Field of Search .................... 210/151, 169, 210/290, 264, 266, 282, 283, 284, 416.2, 661, 663; 119/259, 260

[56] References Cited

U.S. PATENT DOCUMENTS

| | | |
|---|---|---|
| 546,883 | 9/1895 | Gunther . |
| 3,135,238 | 6/1964 | Eyl .............................................. 119/5 |
| 3,471,025 | 10/1969 | Dobson .................................... 210/290 |
| 3,693,798 | 9/1972 | White ....................................... 210/169 |
| 3,933,629 | 1/1976 | Smith ....................................... 210/150 |
| 3,963,620 | 6/1976 | Vor .......................................... 210/279 |
| 4,002,566 | 1/1977 | Smith ....................................... 210/169 |
| 4,009,099 | 2/1977 | Jeris ......................................... 210/151 |
| 4,606,821 | 8/1986 | D'Imperio ............................... 210/169 |
| 4,608,181 | 8/1986 | Hsiung et al. ........................... 210/786 |
| 4,627,923 | 12/1986 | Ross ......................................... 210/744 |
| 4,833,594 | 5/1989 | Sekoulove ............................... 210/603 |
| 4,863,594 | 9/1989 | Pedretti ................................... 210/169 |
| 4,869,815 | 9/1989 | Bernard et al. ......................... 210/151 |

(List continued on next page.)

FOREIGN PATENT DOCUMENTS

| | | |
|---|---|---|
| 0344295 | 3/1994 | European Pat. Off. . |
| 3544383 | 1/1987 | Germany . |

OTHER PUBLICATIONS

Heinen et al. "Tolerance to Formalin . . . ", J. World Aquaculture Soc., vol. 26. No. 1. Mar., 1995. pp. 65–71.

Bullock et al. "Qualitative and Quantitative Bacteriological Studies . . . ", U.S. Dept of Int. Biological Rep. 17, Jul., 1993.

Ko et al. "Area Specific Nitrification Rates of a Micro–Bead Filter", Acquaculture '95 Feb. 1–4, 1995.

Sutton et al. "Biological Fluidized Beds . . . " Water Environment and Tech., Aug. '91 pp. 52–56.

Paller et al., "Use of Ozone and Fluidized Bed Biofilters . . . " Progressive Fish Culture, 50:141–147 (1988).

Jewell, "Wastewater treatment by Immobilized Cells" Ch. 9 pp. 223–252.

Malone et al., "Design of Recirculating Soft Crawfish Shedding Systems", Louisiana Sea Grant College Program, Jun., 1988.

Jewell et al., "Expanded Bed Treatment of Complete Recycle, Aquaculture Systems", Agricultural and Biological Engineering Department, Cornell University, Conference in Nice, France, Apr., 1989.

Primary Examiner—Jay H. Woo
Assistant Examiner—Fred Prince
Attorney, Agent, or Firm—Stroock & Stroock & Lavan LLP

[57] ABSTRACT

An aquarium filter for removing chemical and physical waste from an aquarium. The filter can include a mechanical filter portion, followed by a fluidized bed of particles, such as sand, for removing ammonia from the water and then a chemical filter portion. The filter can be constructed in an aesthetically desirable manner and can be convenient to maintain.

24 Claims, 10 Drawing Sheets

U.S. PATENT DOCUMENTS

| | | | |
|---|---|---|---|
| 4,915,828 | 4/1990 | Meyers et al. | 210/110 |
| 4,988,436 | 1/1991 | Cole | 210/169 |
| 5,011,600 | 4/1991 | Mowka | 210/169 |
| 5,055,186 | 10/1991 | Van Toever | 210/150 |
| 5,062,951 | 11/1991 | Tominaga | 210/169 |
| 5,171,438 | 12/1992 | Korcz | 210/169 |
| 5,172,650 | 12/1992 | Hsu | 119/5 |
| 5,336,401 | 8/1994 | Tu | 210/169 |
| 5,433,843 | 7/1995 | Calabrese | 210/138 |
| 5,453,183 | 9/1995 | Hoffa | 210/169 |
| 5,527,455 | 6/1996 | Hoffa | 210/169 |
| 5,628,905 | 5/1997 | Montalbano | 210/615 |
| 5,632,887 | 5/1997 | Gargas et al. | |
| 5,667,671 | 9/1997 | Munsch et al. | |

FLUIDIZED BED AQUARIUM FILTRATION SYSTEM

CROSS REFERENCE TO RELATED APPLICATIONS

This application is a continuation-in-part of Ser. No. 08/800,912 filed Feb. 13, 1997, now U.S. Pat. No. 5,746,921, and is a division of Ser. No. 08/481,729, filed Jun. 7, 1995, now U.S. Pat. No. 5,632,887.

BACKGROUND OF THE INVENTION

The invention relates generally to aquariums and more particularly to a system for maintaining a healthy environment for fish within the aquarium by removing undesirable materials from the aquarium water.

Undesirable material is being generated constantly within an aquarium. Fish ingest food and eliminate solid and chemical wastes. Uneaten food also leads to solid waste. That solid waste can be broken down by bacteria within the tank to form other secondary wastes. These wastes can encourage the growth of algae or other undesirable life forms and stress fish in the aquarium. Accordingly, it is desirable to remove both solid and chemical wastes from an aquarium in order to provide a healthy environment and reduce stress on fish within the aquarium.

A common aquarium filter employs carbon particles for removing organic waste from the aquarium water and a fibrous pad or wad of fibers to trap solid waste. The carbon and fibers are commonly located in a small tank which hangs from the side of the aquarium. A pump is used to draw water from the aquarium into the conventional filter which then flows from the filter back to the aquarium. Changing the charcoal and fiber is inconvenient and the filter has little aesthetic value. Furthermore, the carbon/fiber filter system can be unable to minimize certain wastes that can put stress on fish in the aquarium.

Other conventional filters draw aquarium water into the gravel at the bottom of the aquarium which then flows out through carbon particle cartridges. Solid matter becomes trapped in the gravel, where it can decompose biologically. Some of the biological decomposition leads to undesirable chemical byproducts which can stress the fish. The carbon cartridges are employed to remove organic material from the aquarium water. Such filters leave unsightly debris at the aquarium bottom and are ineffective for removing certain chemical wastes.

Over the years, various attempts have been made to overcome functional and aesthetic drawbacks in conventional filters. U.S. Pat. No. 3,135,238 describes a filter tank mounted on the side of an aquarium. Water is drawn from the aquarium, to the tank, down through a filtering medium such as sand or glass wool for catching waste and sediment, then back to the aquarium by passing up through the gravel for the purpose of additional filtration of the finer particles of waste and foreign matter.

U.S. Pat. No. 4,002,566 describes an external tank that receives waste from the aquarium. The water passes through a coarse filter material in the tank, then back through the bottom of the aquarium and up through the gravel.

U.S. Pat. No. 4,606,821 describes a multi-layer filter in which water flows into the top of the filter, down through multiple layers of filtering media, then up through the bottom of the aquarium. U.S. Pat. No. 4,863,594 also describes a filtration method in which water flows up through the gravel to prevent uneaten food and waste from accumulating therein. U.S. Pat. No. 5,062,951 describes an in-tank pump, which draws in water and forces it up and out through the gravel on the aquarium floor. U.S. Pat. No. 5,172,650 describes an aquarium filter in which sediments are collected separately so that they can be removed without interfering with operation of the filter. The contents of U.S. Pat. Nos. 3,135,238, 4,002,566, 4,606,821, 4,863,594, 5,062,951 and 5,172,650 are incorporated herein by reference.

Although these patents present various ways of attempting to maintaining a healthy environment in an aquarium, they have shortcomings. None present a fully satisfactory method and filter for eliminating waste from the aquarium water. For example, while some of these discusses the use of bacteria colonies in gravel bed, for providing biological filtration, such filtration has not proved to be fully effective for removing undesirable chemicals from the water. Furthermore, the bacteria grow in a generally unrestrained and uncontrolled manner and can be detrimental to the aquarium environment. Also, the accumulation of debris at the bottom of the aquarium is undesirable, unhealthy and unsightly. Finally, many of these filters require flow rates that unduly stress certain types of fish in order to provide effective filtration.

Accordingly, it is desirable to provide an improved aquarium filter which overcomes the drawbacks in the prior art.

SUMMARY OF THE INVENTION

Generally speaking, in accordance with the invention, an aquarium filter is provided for removing chemical and physical waste from an aquarium. The filter includes a fluidized bed of particles, such as sand, for the biological treatment waste in the aquarium water. The filter can also include a physical trap for mechanically filtering solid material and a chemical filtration system, which can include activated charcoal for removing organic material from the aquarium water. The filter cain be constructed to provide the sequence of mechanical filtration, followed by biological filtration and then finally chemical filtration, can be constructed in an aesthetically desirable manner and can be convenient to maintain.

Accordingly, it is an object of the invention to provide an improved aquarium filter for removing solid and chemical waste from an aquarium.

Another object of the invention is to provide a method of maintaining a healthy, clean environment in an aquarium.

A further object of the invention to provide an aquarium filter that is aesthetically pleasing.

Yet another object of the invention is to provide an aquarium filter that is easy to maintain.

Still other objects and advantages of the invention will in part be obvious and will in part be apparent from the specification and drawings.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE PREFERRED EMBODIMENTS

Figure 1:
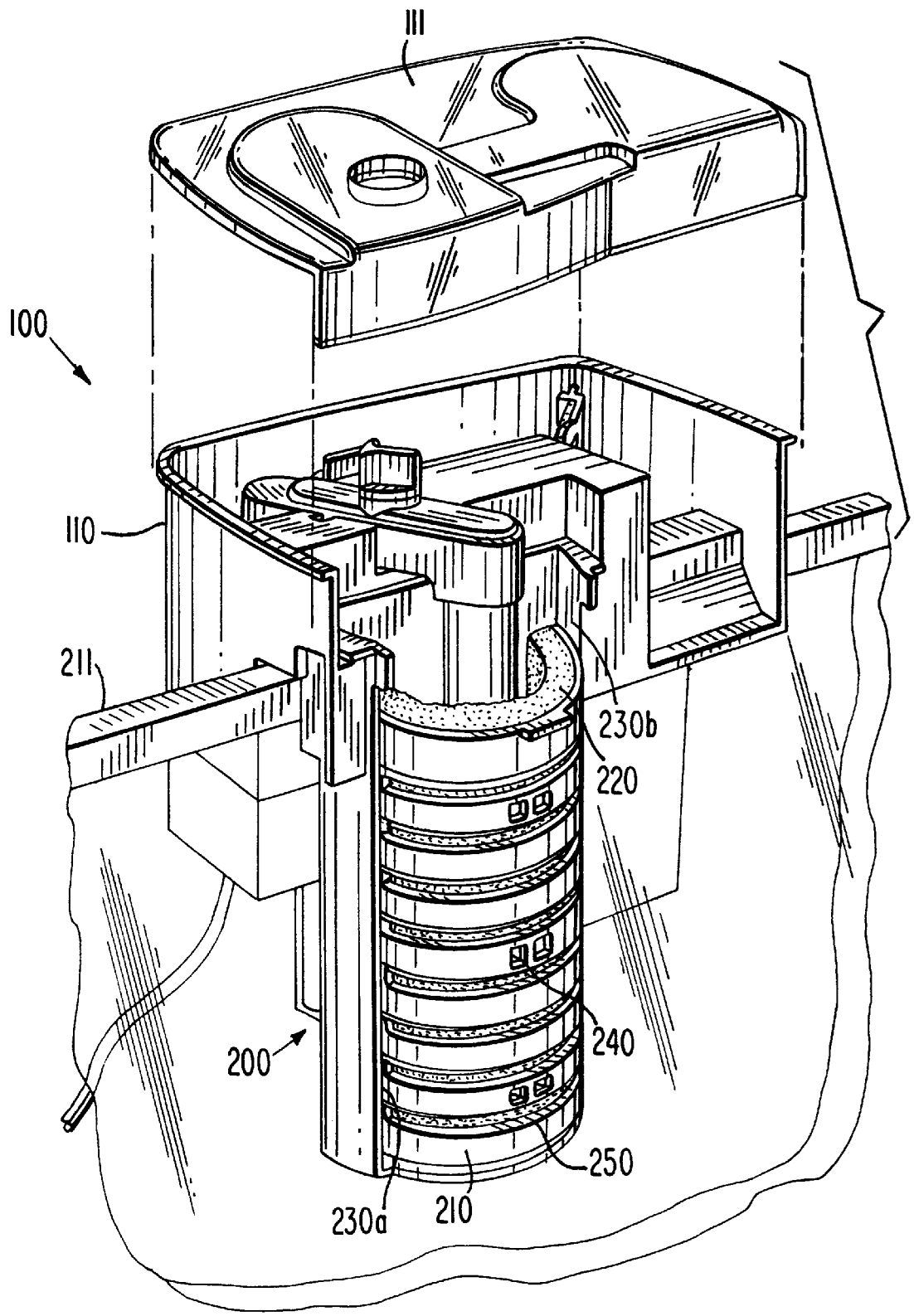
FIG. 1 is a perspective view of an aquarium filter constructed in accordance with a preferred embodiment of the invention.

A filter constructed in accordance with a preferred embodiment of the invention includes a fluidized bed for providing enhanced filtration properties. By promoting desirable biochemical reactions, the filter can maintain desirable water quality despite the pressure of a large fish population (bio-load). The filter includes a column of particles, such as sand or silica. Water is removed from the aquarium and pumped up through this particulate bed at a sufficient rate to "fluidize" the bed of particles in a manner similar to the way gas is used to fluidize a fluidized bed for conducting chemical reactions, so that the particles in the bed are set in relative motion and the height (volume) of the bed increases, relative to that of the bed at rest. Such fluidization will increase effectiveness of the particles for providing biological filtration. Embodiments of the invention are disclosed in U.S. Pat. No. 5,632,887, the contents of which are incorporated herein by reference.

As the velocity of aquarium water flowing up through the column reaches a fluidizing velocity, the drag force on the particles, which is equal to the pressure drop across the bed multiplied by the cross sectional area of the column will substantially equal the weight of the particles and the particles will be in motion and exhibit a churning action. In accordance with an embodiment of the invention, water flows up the column with a uniform velocity profile and particles of similar drag and weight will accumulate at similar levels. Thus, the smaller particles will "rise" to the top and larger particles will churn at the bottom of the column and there will be substantially no top to bottom mixing. If the velocity is below the fluidizing velocity, the bed of particles will remain static. If the velocity is too high, the lightest particles will be blown out the top of the column. However, within a range of fluid velocities that varies with the particle and column dimensions, the particles are set in motion and the height of the bed increases.

By selecting particles of appropriate dimensions, the growth of nitrifying autotrophic bacteria thereon can be emphasized. Autotrophic bacteria, such as nitrosomonas, are primarily responsive for the nitrification process and oxidize ammonia ($NH_3$) into nitrites ($NO_2-$). Other autotrophic bacteria include nitrobacter, which convert these nitrites ($NO_2-$) into nitrates ($NO_3-$). Thus, by passing the aquarium water past these autotrophic bacteria, ammonia levels in the aquarium water can be reduced by conversion into nitrates. By passing the water over the particles at a velocity to set the particles in motion, the effectiveness of the biological filtration will be enhanced.

Heterotrophic bacteria are responsible for producing the slime that forms in the aquarium on glass, plants, filter parts and so forth. These bacterium convert waste into ammonia. Therefore, if these bacterium are permitted to grow, they will have a deleterious effect on water quality. Consequently, by promoting the growth of nitrifying autotrophic bacteria, and limiting the growth of heterotrophic bacteria on the fluidized bed particles, ammonia levels within the aquarium can be greatly reduced. Autotrophic bacteria are typically much smaller than heterotrophic bacteria. It was discovered that if the particles in the bed are sufficiently small and have suitable pores and/or other surface irregularities, the particles will be colonized primarily by nitrifying bacteria within the pores and irregularities.

An added benefit of a fluidized bed filter in accordance with the invention is the reduction in nitrate levels. The filter is extremely efficient in converting $NO_3$ into $N_2$. Thus, oxygen levels in some portions of the filter, such as at the top of the column, will drop to very low levels. With time, significant numbers of dissimilatory bacteria, which use $NO_3$, rather than $O_2$, will appear. In time, they will reduce the $NO_3$ in the tank to harmless byproducts such as $N_2$. Thus, a filter in accordance with a preferred embodiment of the invention of can exhibit at least three filtration zones a lower zone where mineralization occurs, an intermediate zone where ammonia is converted to $NO_2$ and $NO_2$ is converted to $NO_3$ and an upper zone where $NO_3$ is converted to $N_2$ can not only reduce ammonia levels in the aquarium, but nitrate levels as well.

One drawback of static conventional gravel based or sand based biological filters is that they became heavily colonized by heterotrophic bacteria. It was discovered that the churning action of a fluidized bed of particles makes it difficult for the larger heterotrophic bacteria to latch onto the outside of the particles. Thus, while the desirable nitrifying bacteria can grow in the protected irregular contours of the particles, the undesirable larger heterotrophic bacteria tend to become scoured off the outside of the particles so that the net result is a column of particles colonized primarily by nitrifying bacteria. Thus, the particles can significantly decrease the ammonia content of the aquarium water by providing superior biological filtration than conventional biological filters.

For aesthetic purposes, it is desirable to construct a column with a rectangular cross-section. The churning particles of the fluidized bed also provides an intriguing visual effect. Thus, the filter can actually enhance the overall visual appearance of the aquarium, rather than detract from it. Furthermore, a square shape also leads to an approximately 25% increase in cross sectional area over a cylindrical column of equal cross sectional width. However, the rectangular or square shape makes it difficult to fluidize the particles.

It was discovered that by passing the water through appropriate structures, the flow can become more evenly spread out across the entire cross-section of the column. This more uniform fluid velocity profile significantly improves the efficiency of the filter, and prevents the formation of dead spots, which can lead to the growth of undesirable bacteria.

Also, by minimizing top to bottom mixing of water within the column, it is more likely to develop multiple filtration zones and less likely to blow particles out the top of the column.

One way to achieve a uniform flow profile with a square or rectangular cross section column is to pass the water from the aquarium through a diffusion plate, also referred to as a flow distribution plate, which can be constructed as a plate having perforations completely therethrough, located across the entire bottom of the bed. By sizing the holes in an appropriate manner, a more uniform flow profile across the column can be provided. The holes can be uniform throughout the thickness of the plate, cone shaped or hour glass shaped. A uniform distribution with double taper holes described below has been found to be particularly desirable.

It can be useful to include large particles, such as large sand in the column. Large sand is used to support the finer particles, and if the flow is sufficient to generate some movement or churning (partial or complete fluidization) of the larger supporting particles, there will be a self-scouring action which inhibits the growth of heterotrophic bacteria. This can even out the flow profile and/or prevent smaller particles from falling through the plate. Hence, the column can become virtually maintenance free for extended periods of time.

An aquarium filtration system 100, constructed in accordance with a preferred embodiment of the invention is shown generally in FIGS. 1–8. Filtration system 100 includes a housing 110 which defines three filtration units. As shown by arrows A, water 20 from an aquarium 21 is first drawn into mechanical filtration unit 200. Filtration unit 200 includes a removable cover 210, formed with a series of louvered slits enclosing a removable filter pad 220. The louvers help retain waste particles and prevent waste particles from falling back into the tank when the pad holder is removed to change the pad. Thus, as unfiltered water 20 flows through filter pad 220 in the direction of arrows A, it is subjected to mechanical filtration which removes the largest waste particles within the aquarium water. When filter pad 220 becomes contaminated, it can be conveniently removed and a new filter pad installed in its place.

In a preferred embodiment of the invention, cover 210 is slideable in grooves defined by a pair of retaining walls 230a and 230b, so that after a lid 111 is removed from housing 110, cover 210 can be slid up and out of housing 110.

Cover 210 is provided with multiple hooks 240 which can be in the form of inwardly extending T's. Filter pad 220 can be provided with holes or slits corresponding to each of hooks 240 and thereby retained to cover 210 in a shape which will conform generally to cover 210. Cover 210 is then slid into the grooves formed by walls 230a and 230b until the bottom of cover 210 contacts a floor 250 of mechanical filtration unit 200. By providing cover 210 and filter pad 220 in a convex shape, greater surface area for mechanical filtration can be provided in the same amount of filter width.

Figure 6:
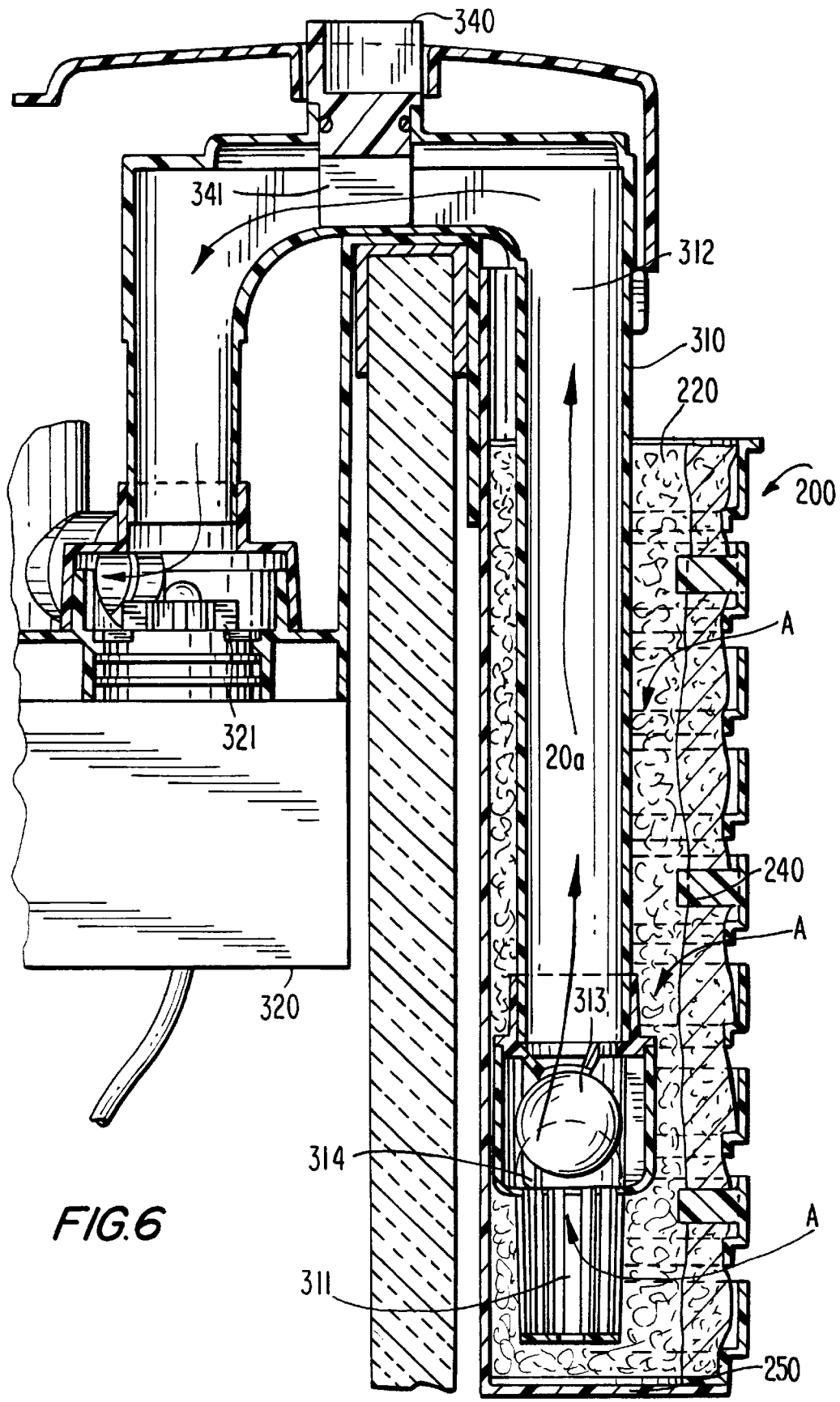
FIG. 6 is a partial side cross-sectional view of the filter of FIG. 2 taken along line 6—6.
Figure 7:
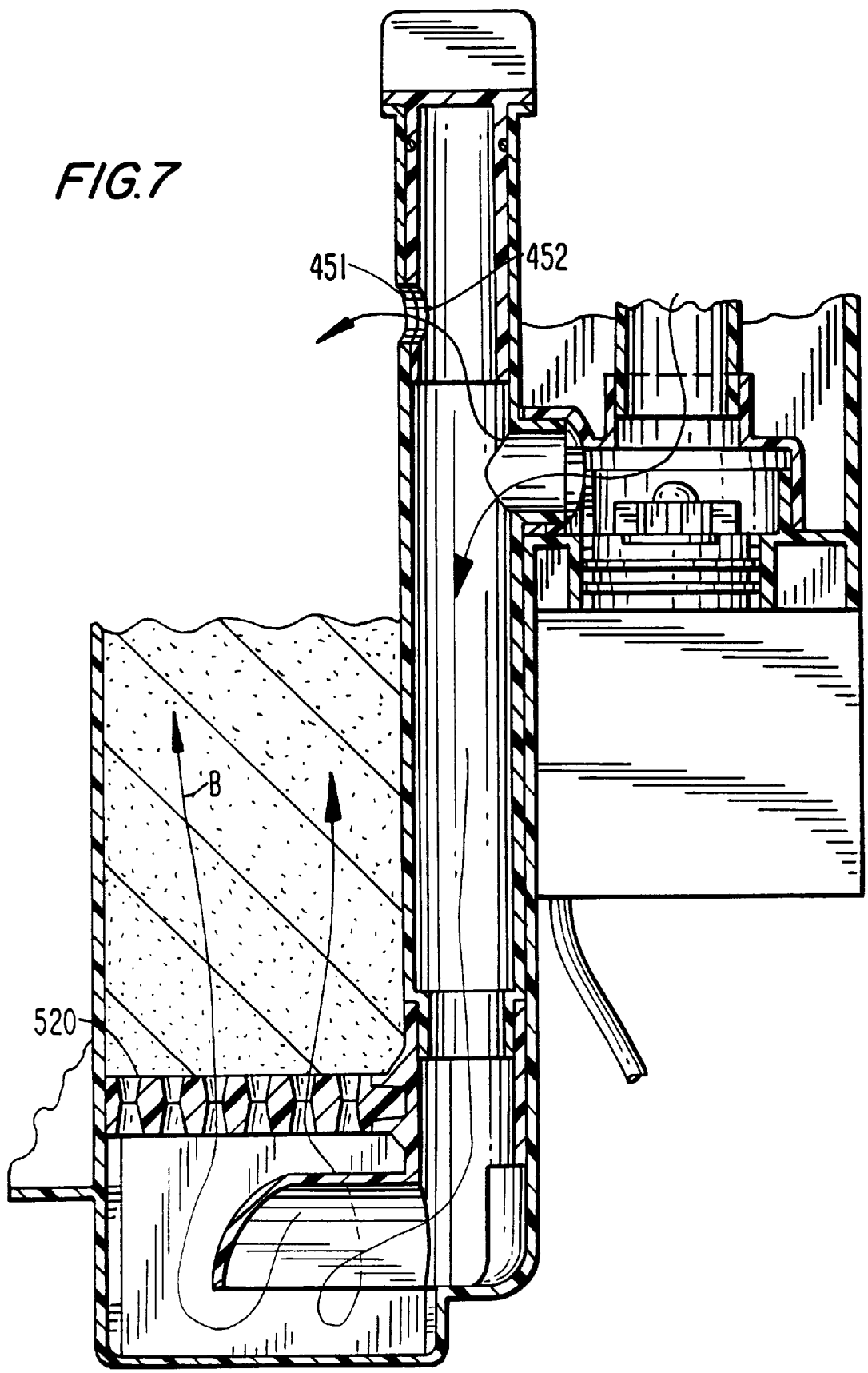
FIG. 7 is a partial cross-sectional view of the filter of FIG. 2, taken along line 7—7.

Referring to FIG. 6, after water passes through filter pad 220, it is drawn up an intake tube 310 from the suction generated by an impeller 321 of a power head 320. Mechanically filtered water 20a flows through slots 311 at the bottom of tube 310, up through a vertical rise portion 312 of tube 310 and then to impeller 321.

Vertical rise tube 312 includes a ball 313 at the bottom thereof. When water is not being sucked up vertical rise tube 312, ball 313 can nest in a circular opening 314 at the bottom of vertical rise tube 312, as shown by the broken line in FIG. 6. Ball 313 helps prevent any siphoning of water out of filter 100 when power head 320 is turned off.

Figure 3:
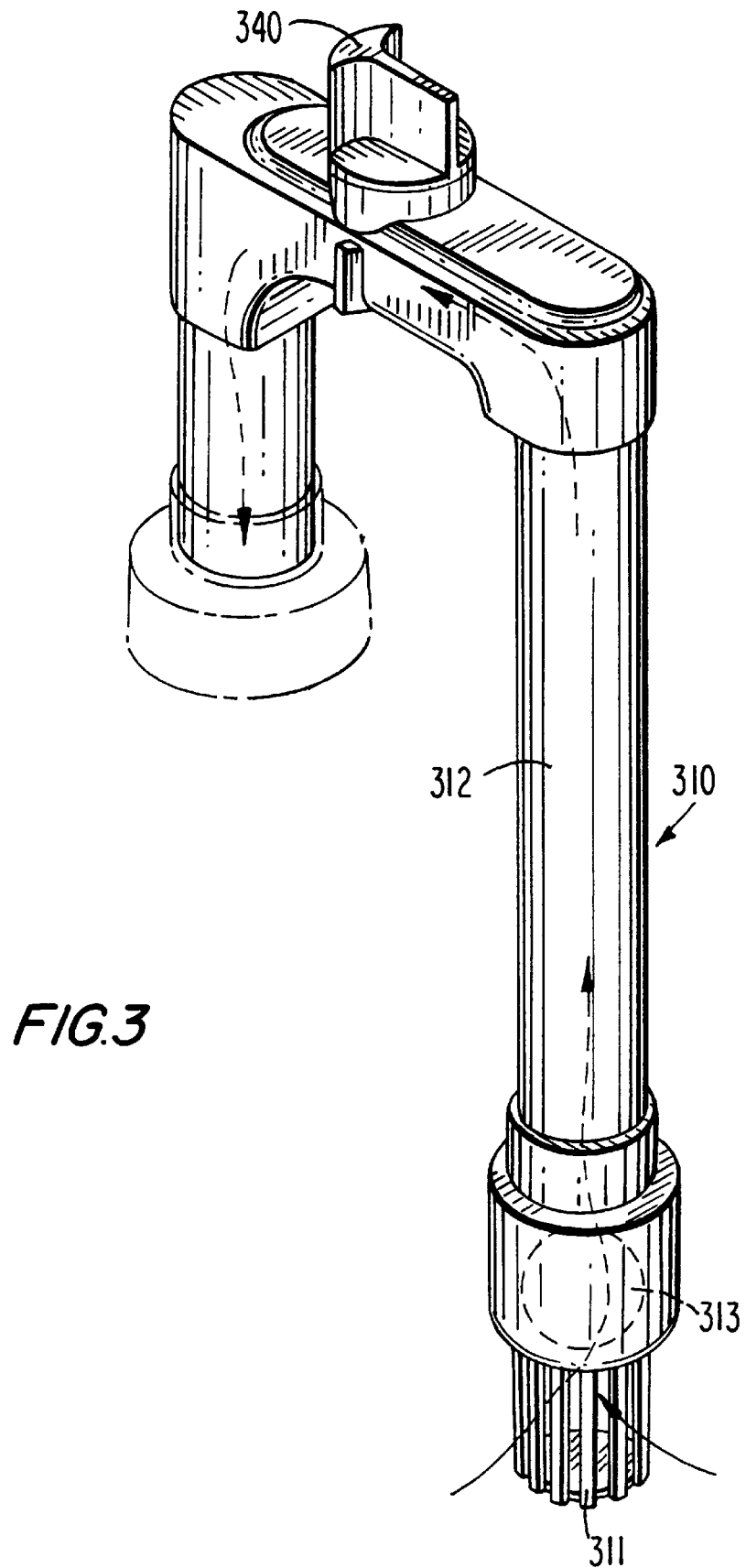
FIG. 3 is a perspective view of an intake tube of the filter of FIG. 1.

Referring to FIGS. 3 and 6, intake tube 310 includes a flow control valve 340. Valve 340 includes a gate 341 in the form of a flat plate, which can be used to fine tune the flow of water through filter 100. For example, it is desirable to turn down the water flow during feeding or filter maintenance.

Figure 4:
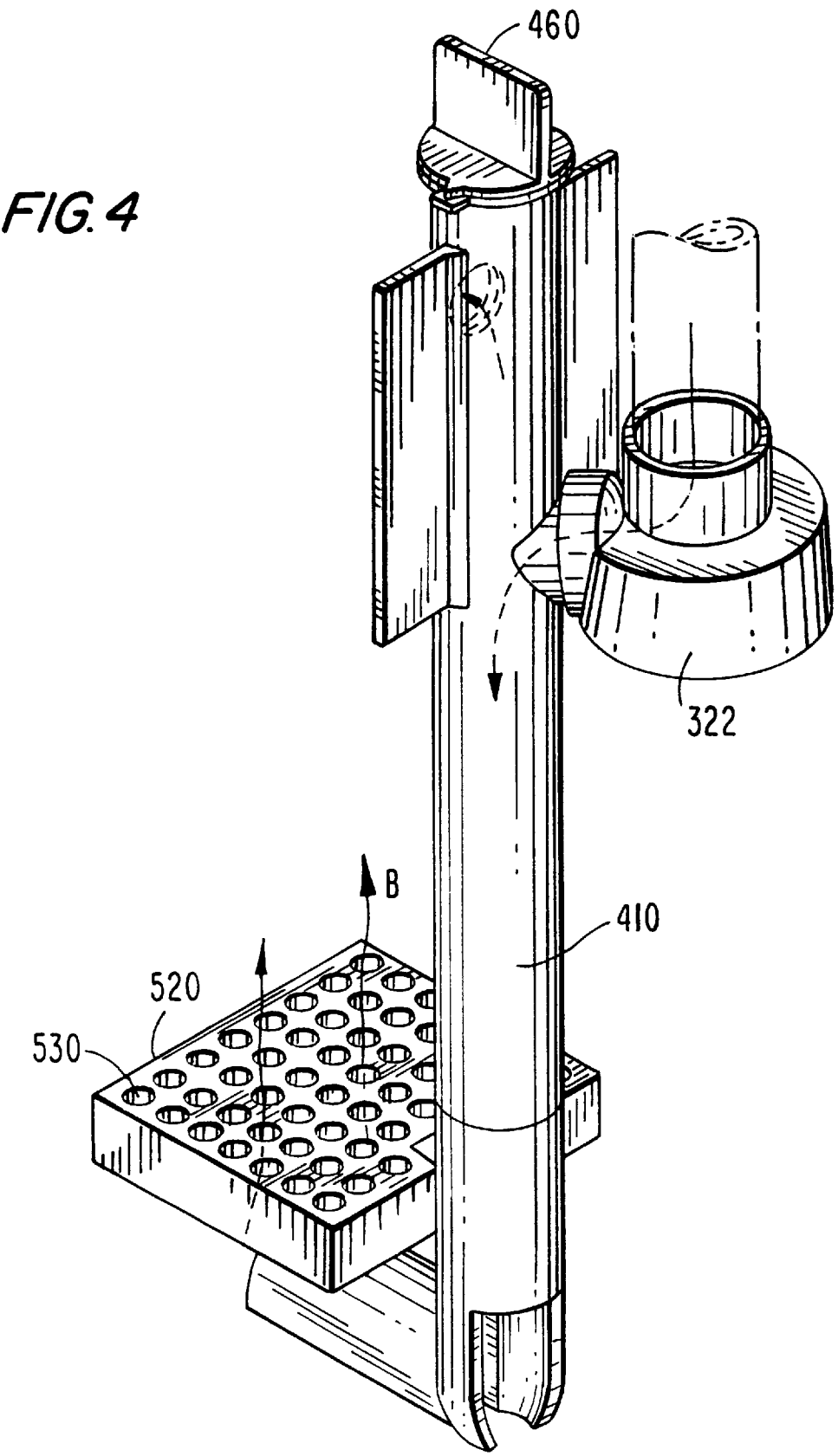
FIG. 4 is a perspective view of a diffusion plate and water flow tube of the filter of FIG. 1.
Figure 5:
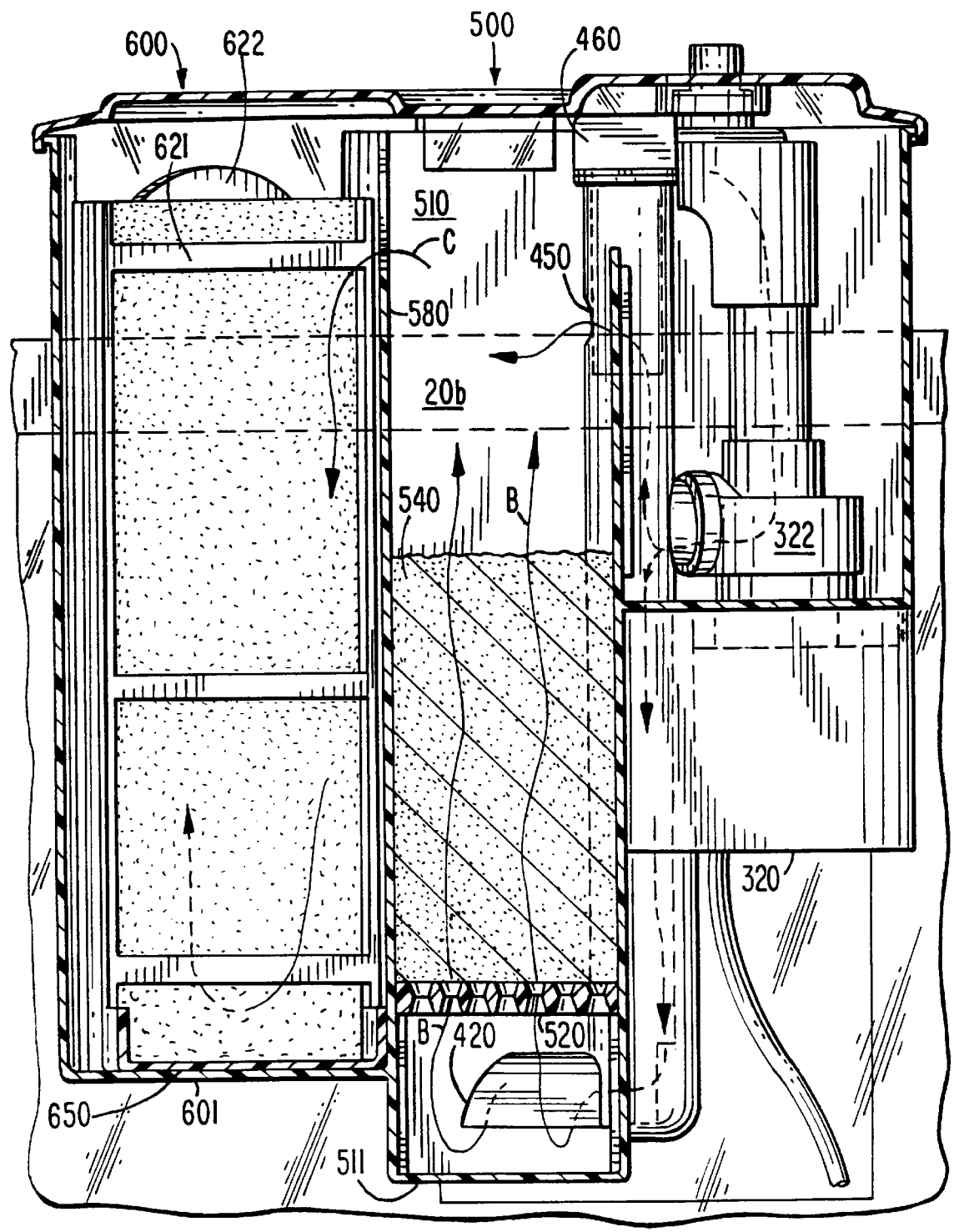
FIG. 5 is a rear cross-sectional view of the filter of FIG. 2 taken along line 5—5.

Referring to FIGS. 4 and 5, after mechanically filtered water 20a leaves impeller 321, it flows through an impeller cover 322 and down a downtake tube 410 to the bottom of a fluidized bed filtration unit 500. Fluidized bed filtration unit 500 includes a column 510 having a bottom wall 511. Water flows out of a downspout 420 at the bottom of tube 410 towards bottom 511 and then up through a diffusion plate 520 in the direction of arrows B.

In one embodiment of the invention, plate 520 is 2¼ inches square, ¼ inch thick and defines an 8×8 grid of 64 evenly spaced holes. In another embodiment of the invention, plate 520 can be 2¼ inches in the front to back direction and have 8 holes in this direction and be 2 inches wide in the side-direction and have 7 holes in this direction to provide an 8×7 grid of 56 evenly spaced holes. In still another embodiment of the invention, two of the 56 holes which would be closest to tube 410 are eliminated in favor of a bulge in plate 520 to accommodate tube 410, leading to 8×7−2=54 holes. Wells which do not extend completely through plate 520 can be included between the holes, in part to reduce material consumption. About 40 to 110 evenly spaced holes is suitable.

The following chart provides examples for the construction of diffusion plates and column heights.

| Model | Plate Dimensions (inches) | Bed height above plate (inches) | Sand weight (grams) | Sand weight range (grams) | 0.075 inch diameter hole distribution |
|---|---|---|---|---|---|
| A | 1 ¾ × 1 ¾ × ⅜ | 3 ¾ | 100 | 50–150 | 7 × 7 − 2 = 47 |
| B | 2 ¼ × 2 × ⅜ | 4 ⅜ | 200 | 150–300 | 8 × 7 − 2 = 54 |
| C | 2 13/16 × 2 13/16 × ⅜ | 5 ½ | 500 | 400–600 | 10 × 10 − 3 = 97 |

The uniform distribution of holes as well as initially directing the flow of water downwards, both help for promote a uniform velocity profile of water flowing up through column 510, without the formation of relatively high velocity jets or low velocity dead spots. Holes 530 can have a substantially uniform shape, a top tapered section, a bottom tapered section, or a double tapered section, such as that depicted in FIG. 10 and discussed below.

Column 510 also includes a bed of particles, such as sand or silica 540. As water flows through holes 530 into bed of particles 540, it will lift the particles and send them in motion relative to each other, thereby increasing the volume of bed 540. A uniform velocity flow profile can often be indicated by a substantially flat top to the fluidized bed of particles, as opposed to a bed in which the top of the bed appears to percolate significantly.

Downtake tube 410 also includes a diverter passageway 450 leading to an air valve 460. Air valve 460 is in the form of a cylinder nesting in the top of downtake tube 410 and has a hole 452, sized to match a hole 451 in tube 410. Accordingly, diverter passageway 450 can be opened by aligning holes 451 and 452, and air can be bled from the system during startup. After the air is bled from the system, passageway 450 can be closed.

Figure 2:
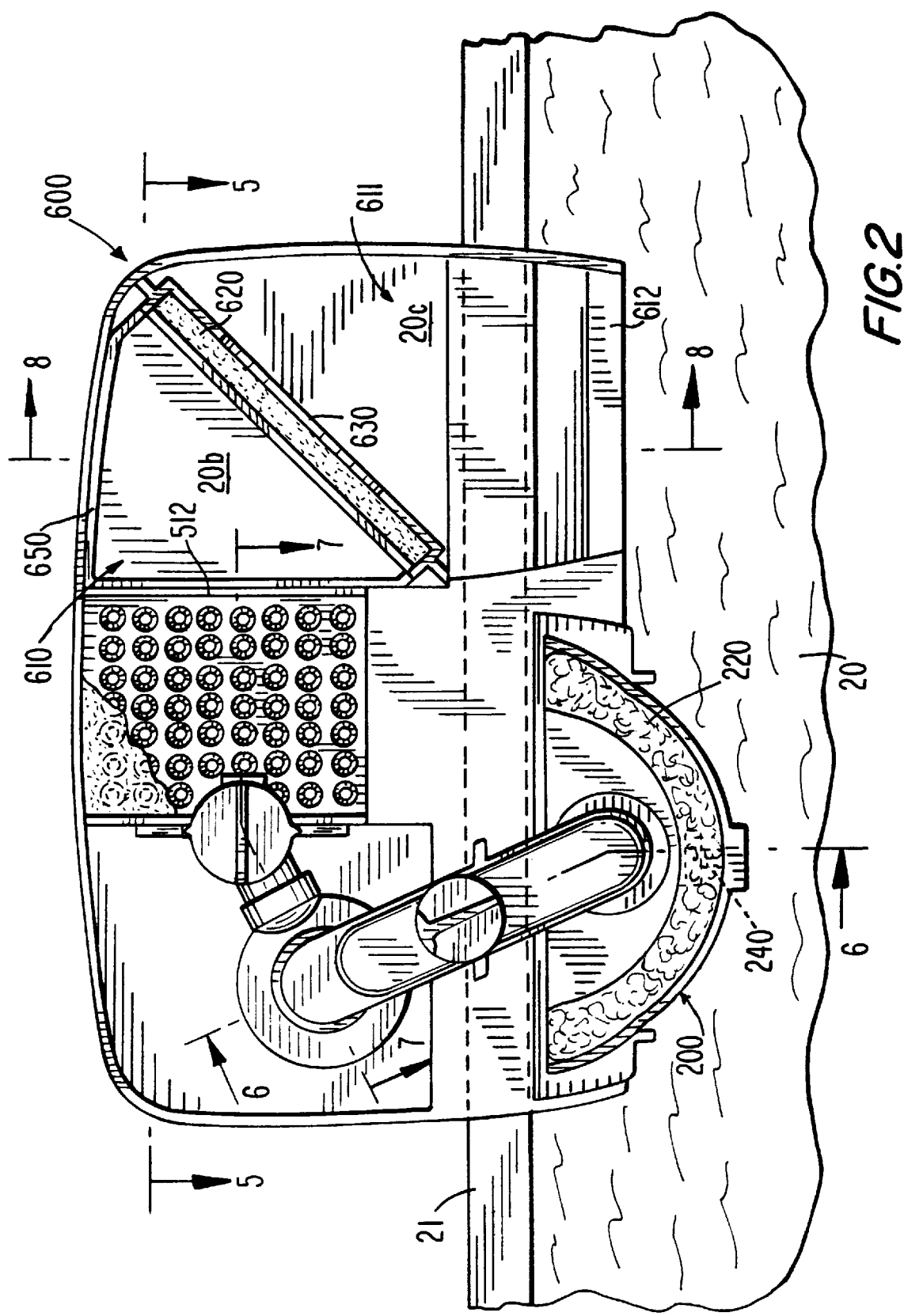
FIG. 2 is a top view of the filter of FIG. 1.

After water flows up through column 510, it flows over a lip 512 to a chemical filtration unit 600 in the direction of an arrow C. Referring to FIG. 2, chemical filtration unit 600 includes a first region 610, which receives mechanically and biologically filtered water 20b. Thereafter, it flows through a carbon impregnated filter pad 620 to become mechanically, biologically and chemically filtered water 20c.

Figure 8:
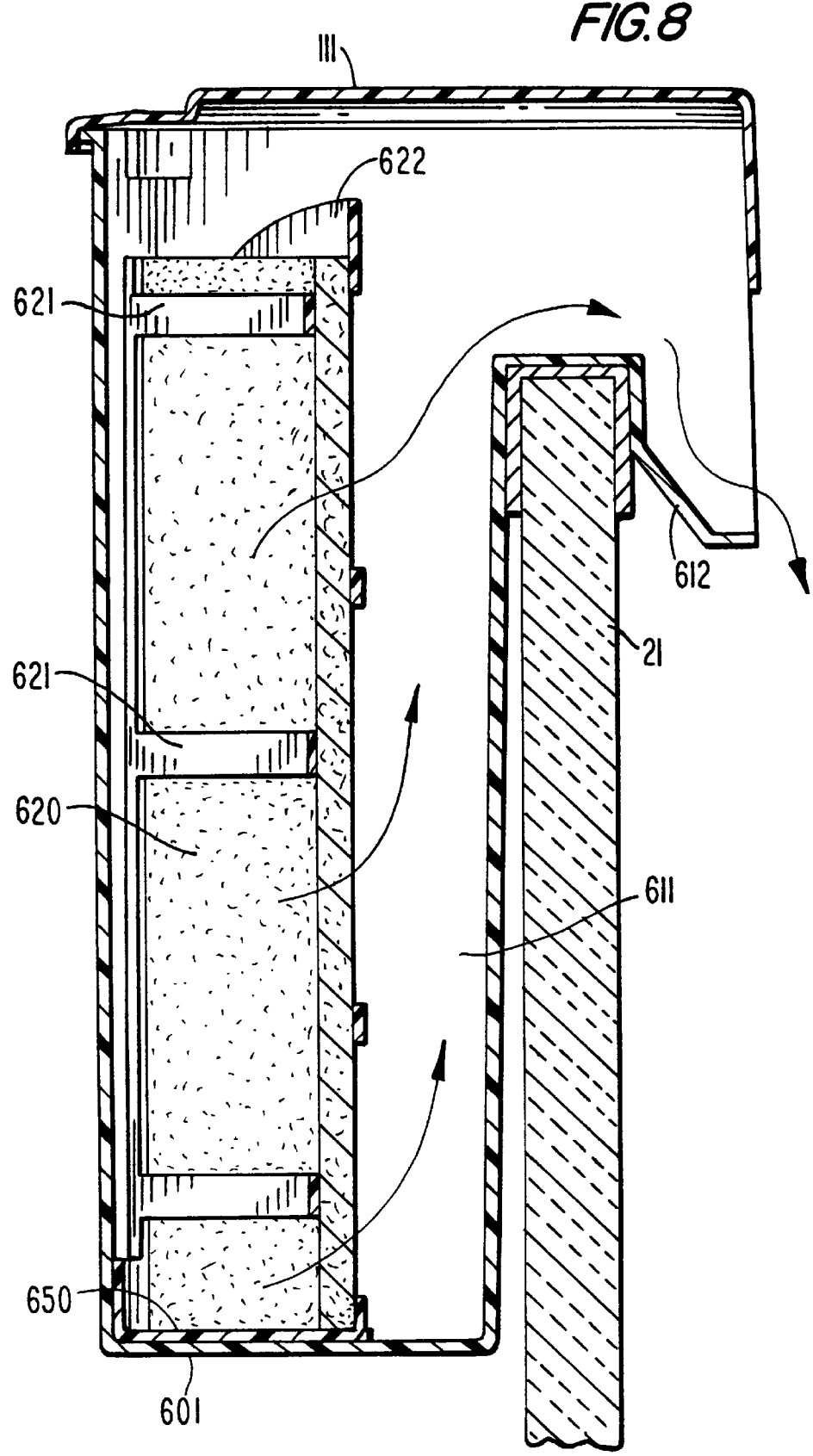
FIG. 8 is a side cross sectional view of the filter of FIG. 2, taken along lines 8–8.

Carbon pad 620 is held in a removable pad holder 630, which has a plurality of pad holding bands 621 shown in FIG. 8 and a gripable tab 622 at the top thereof. Pad holder 620 is also provided with a triangularly shaped tray 650 at the bottom thereof. Tray 650 fits against the back wall of housing 110, a wall 580 separating unit 600 from unit 500 and a bottom wall 601 defining the bottom of chemical filtration unit 600. Sand which is inadvertently blown over lip 512 will collect in tray 650 and can be removed when pad holder 630 is removed from housing 110.

After water 20b flows over lip 512 into compartment 610, it flows through carbon impregnated pad 620 where it is subjected to chemical filtration and into compartment 611. Thereafter, water which has been mechanically, then biologically, then chemically treated 20c flows over a spillway 612 to aquarium 21.

In a preferred embodiment of the invention, filter pad 620 is approximately 7 inches tall by 3 inches wide, pad cover 210 is hemisphereically shaped and approximately 3.5 inches wide and stores a pad having a rectangular shape, a height of about 7 inches and a flattened width of about 4.5 inches and a thickness of about ¼ inch. The tubes have an OD of about 0.75 inches and an ID of about 0.66 inches. Referring to the above models A, B and C, the tubes have an ID of approximately ½, ¹¹⁄₁₆ and ¹³⁄₁₆ inches respectively. In one embodiment, downspout 420 has a constricted diameter, which can be about 0.45 inches, to help push the water through plate 520 in a preferred condition.

Power head 320 can be rated at about 50–200 gallons per hour. With respect to the above models A, B and C, the power head should be able to deliver 75, 110 and 170 gallons per hour free flow, leading to about 60–65, 85–90 and 160–165 gallons per hour respectively. Models A, B and C are acceptable for use with tanks in the 5–20, 20–40, 30–75 gallon range, respectively.

As noted above, the velocity of water through the column of the fluidized bed portion of the filter determines whether the bed will become fluidized. Larger particle diameters, higher solid densities, more aerodynamic particles and larger void spaces between the particles lead to a need for higher fluid velocity through the column. Likewise, beds with lighter or smaller particles, having irregular shapes and little void regions between the particles will become fluidized at slower fluid velocities through the column.

Sand or silica of a particular grade is generally made up of particles of various sieve number sizes. Thus, a pound of grade 20/30 silica is approximately 7.5%. Sieve No. 20, 90% Sieve No. 30 and about 2.5% sieve no. 40. Approximate size distribution for 20/30, F-35 and F-50 silica are given below in Table 1.

TABLE 1

| Particle Size Distribution | | | |
|---|---|---|---|
| Sieve No. | 20/30 | F-35 | F-50 |
| 20 | 7.5% | | |
| 30 | 90% | 3% | 1% |
| 40 | 2.5% | 50% | 11% |
| 50 | | 40% | 34% |
| 70 | | 6% | 35% |
| 100 | | 1% | 16% |
| 140 | | | 2% |
| 200 | | | 1% |

In use, the larger particles will collect towards the bottom of the fluidized bed column and the smaller particles will reside near the top of the fluidized bed. The heavier particles may only churn and will help distribute the flow more evenly, as the smaller particles become more classically fluidized. The use of multiple sizes of sand helps prevent vertical channeling, while permitting use of fine sand particles having very high surface areas and the ability to perform very high biological conversions. For a smaller filter of about 2"×2" and about 6" tall or greater, about 1–2.5 oz. of 20/30 silica and 6–8 oz. of F-35 silica, yielding a surface area of about 20–30 ft$^2$ provides suitable results for aquariums of up to about 40–50 gallons, at flow rates of about 50–80 gallons per hour. For larger tanks, a 3"×3" column over 10" high and run at over 100 gallons per hour is suitable. This column can be filled with about 3–5 oz. 20/30 silica, 4–5.5 oz. F-35 silica and 10–15 oz. F-50 silica, for a total area of 50–70 ft$^2$.

The particle distribution for a high flow rate system of about 1000 to 2000 gallons per hour is shown below in Table 2. The particle distribution for a 500 to 1000 gallon system is shown below in Table 3. These systems can be run in a 6"×6"×6' rectangular column. Generally, the system may have at least 5%, preferably 10% of at least 5 sieve nos. of sand to obtain a suitable range of particle sizes and over 800, preferably over 1000 ft$^2$ of surface area, and fluidization of 200–300%, preferably over 300%.

TABLE 2

| High Flow Rate Systems: 1000 to 2000 Gallons Per Hour | | | | | | |
|---|---|---|---|---|---|---|
| | lb. of | | | | Total | |
| Sieve No. | 20/30 | F-35 | F-42 | F-50 | (lb.) | Wt. % |
| 20 | 0.1875 | 0 | 0 | 0 | 0.1875 | 1 |
| 30 | 2.25 | 0.27 | 0 | 0.16 | 2.68 | 10 |
| 40 | 0.0625 | 4.5 | 0 | 1.76 | 6.3225 | 23 |
| 50 | 0 | 3.6 | 0 | 5.44 | 9.04 | 33 |
| 70 | 0 | 0.54 | 0 | 5.6 | 6.14 | 22 |
| 100 | 0 | 0.09 | 0 | 2.56 | 2.65 | 10 |
| 140 | 0 | 0 | 0 | 0.32 | 0.32 | 1 |
| 200 | 0 | 0 | 0 | 0.16 | 0.16 | 1 |
| Total | 2.5 | 9 | 0 | 16 | 27.5 | 1.00 |
| Surface | 46 | 303.3 | 0 | 800 | 1149.3 | |

TABLE 2-continued

High Flow Rate Systems: 1000 to 2000 Gallons Per Hour

| Sieve No. | lb. of | | | | Total | |
| --- | --- | --- | --- | --- | --- | --- |
| | 20/30 | F-35 | F-42 | F-50 | (lb.) | Wt. % |
| area sq. ft. | | | | | | |

TABLE 3

Low Flow Rate Systems: 500 to 1000 Gallons Per Hour

| Sieve No. | lb. of | | | | Total | |
| --- | --- | --- | --- | --- | --- | --- |
| | 20/30 | F-35 | F-42 | F-50 | (lb.) | Wt. % |
| 20 | 0.1875 | 0 | 0 | 0 | 0.1875 | 1 |
| 30 | 2.25 | 0.075 | 0 | 0.175 | 2.5 | 11 |
| 40 | 0.0625 | 12.5 | 0 | 1.925 | 3.2375 | 14 |
| 50 | 0 | 1 | 0 | 5.95 | 6.95 | 31 |
| 70 | 0 | 0.15 | 0 | 6.125 | 2.275 | 28 |
| 100 | 0 | 0.025 | 0 | 2.8 | 2.825 | 13 |
| 140 | 0 | 0 | 0 | 0.35 | 0.352 | 2 |
| 200 | 0 | 0 | 0 | 0.175 | 0.175 | 1 |
| Total | 2.5 | 2.5 | 0 | 17.5 | 22.5 | 1.00 |
| Surface Area Sq. Ft. | 46 | 84.25 | 0 | 22.5 | 1005.25 | |

A particularly useful type of sand is referred to as sawing sand, available from U.S. Silica Corp. of Illinois. This sand has the following characteristics:

| Sieve No. (mesh) | Amount | cm$^2$/gram surface area | grains/gram |
| --- | --- | --- | --- |
| 20 | trace | 21.8 | 2,012 |
| 30 | 9% | 39.82 | 5,780 |
| 40 | 54% | 48.7 | 16,400 |
| 50 | 32% | 50.9 | 46,080 |
| 70 | 4% | 113.0 | 130,039 |
| 100 | 1% | 160.0 | 369,000 |
| 140 | trace | 226.0 | 1,039,400 |
| Total | 100% | 66 (0.071 ft$^2$/g) | |

Thus, Model A filters with about 100–125 grams of sand will have about 8.9 ft$^2$, Model B filters, with at least 200–250 grams of sand will have 17.75 ft$^2$ and Model C filters, with about 400–500 grams of sand will have 35.5 ft$^2$ surface area.

Thus, the water in an aquarium can be kept suitably clean by passing it through a column of particles having nitrifying bacteria thereon in order to remove ammonia from the water after first passing the water through fibrous filters, and then chemical filters, such as a fiber pad impregnated with activated charcoal. The column of particles including the nitrifying bacteria is preferably in the form of a fluidized bed which preferably has a rectangular cross-section.

Figure 11:
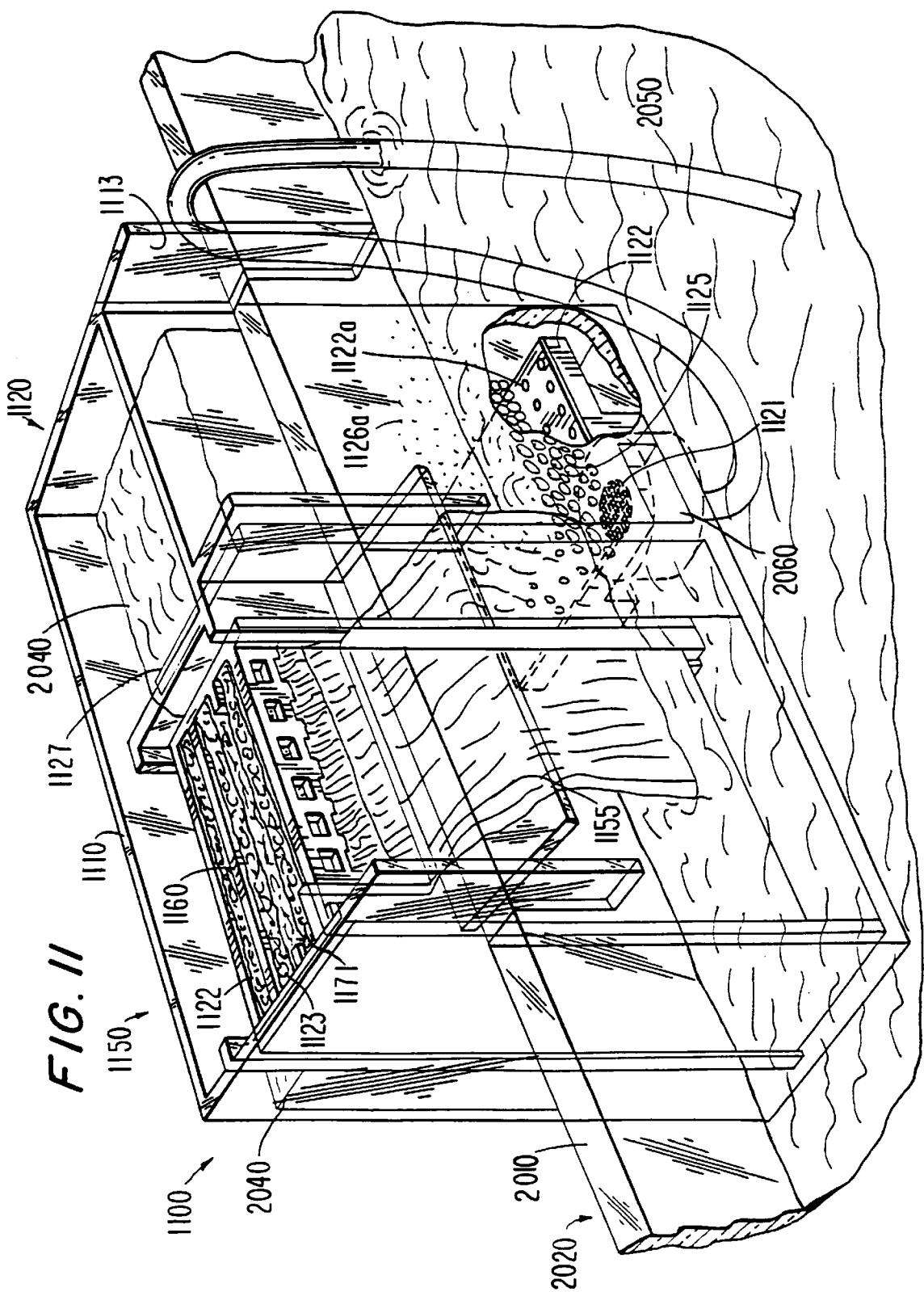
FIG. 11 is a perspective view of an aquarium filter constructed in accordance with another embodiment of the invention.

An aquarium filter constructed in accordance with a another embodiment of the invention is shown generally as filter 1100 in FIG. 11. Filter 1100 includes a housing 1110 defining two compartments, a column 1120 and a filtration region 1150. Filter 1100 also includes a plurality of hooks 113 for hanging filter 1100 from a side 2010 of an aquarium 2020. The specific construction of filters 1100 and 100 are presented for purposes illustration only and are not intended to be construed in a limiting sense.

Column 1120 is shown with a generally square cross-section. Column 510 is shown with rectangular cross sec-tions. However, a round cross-sectional configuration or a cross-sectional shape of some other configuration can be used. Nevertheless, a square or rectangular cross-sectional shape has been found to be the most aesthetical desirable and the most efficient in terms of cross-sectional area for a given overall width. Cross sectional areas from 1 to 16 square inches and larger have been found suitable. The size of the column depends on the bio load and tank size. Smaller filters and high flow rates can process a high quantity of organic material, but the currents created can be stressful to fish.

Column 1120 includes an inlet 1121 at the bottom center of column 1120. Inlets positioned at other locations are less effective than those at the bottom, center of the column. The initial downwards configuration of filter 1100 is advantageous. Column 1120 also includes a support plate (diffusion or flow distribution) 1122, an optional bed of large diameter particles such as large grain sand 1125 on flow distribution plate 1122 and a layer of smaller particles such as small grain sand 1126a on large particles 1125. Alternatively, sand of one size can be used.

In operation, water 2040 is drawn from aquarium 2020, through a tube 2050 to inlet 1121 by a pump 2060. Pump 2060 is shown mounted directly to the bottom of filter 1100, over inlet 1121. Alternate arrangements in which a pump is located within aquarium 2020, intermediate aquarium 2020 and filter 1100 or in some other location for providing water from aquarium 2020 to inlet 1121 are also acceptable. However, it is aesthetical more desirable to locate pump 2060 directly on filter 1100 to provide a more compact, less scattered appearance.

When pump 2060 is in operation, it forces water up through distribution plate 1122, and through the bed of particles. As long as pump 2060 provides water at a sufficiently high flow rate, it will cause relative movement (fluidization) in the particles causing the particles to travel part of the way up column 1120 and form a fluidized bed small particles.

It is preferable to include diffusion plate 1122 in order to even out the flow profile of water 2040 in column 1120. Without distribution plate 1122 it would be difficult to insure that water 2040 flowing through column 1120 would have a uniform velocity profile, in which the velocity at the center of column 1120 is not substantially higher than at the periphery thereof. The flow through column 1120 is evened out by forcing the water through an arrangement perforations 1122a. This provides a more even flow of water 2040 through fluidized bed 1126 which leads to improved filtration properties.

After water 2040 flows up through fluidized bed 1126, it flows to the top of column 1120 and over a lip 1127 to filtration region 1150. Filtration region 1150 includes a removable filter cartridge 1160. Filter cartridge 1160 includes a first non-perforated side facing column 1120 and a second non-perforated side facing away from column 1120. Water 2040 flowing over lip 1127 is forced around and behind cartridge 1160 and then flows through cartridge 1160, before spilling over ramp 1155 and back to aquarium 2020.

Cartridge 1160 includes a fibrous pad 1171 for trapping physical waste and sediment from water 2040. Cartridge 1160 also includes a pair of activated charcoal impregnated pads for providing additional physical entrapment as well as the removal of organic material. Although other conventional arrangements for removing organic and physical waste from water 2040 are acceptable, it has been found that subjecting water to mechanical filtration, followed by biological filtration and then chemical filtration is particularly advantageous. The mechanical filtration removes the largest particle and permits the chemical and biological filtration areas to concentrate on the more difficult components to remove. Because the chemical filtration is not self sustaining and because biological filtration can benefit from certain components being in the aquarium water to be filtered, which could be removed by the chemical filtration material, it is advantageous to include the chemical filtration last.

Many filters perform chemical filtration first. However, some of the materials which will be absorbed to the charcoal are biodegradable. Thus, they can cause the carbon to be biologically active. This can lead to a building of a bio film and cause the carbon to be less effective. Positioning the carbon last, it can function for a longer amount of time.

One drawback to a conventional configurations employing activated charcoal particles is that they need to be rinsed and are inconvenient to remove. When permitted to remain in a filter for an extended period of time, they begin to be colonized by autotrophic bacteria. This can diminish the ammonia removing effects of filter 100. However, by providing pads in a form that is easy to remove and replace, the chance for autotrophic bacteria to become established is diminished.

Figure 9:
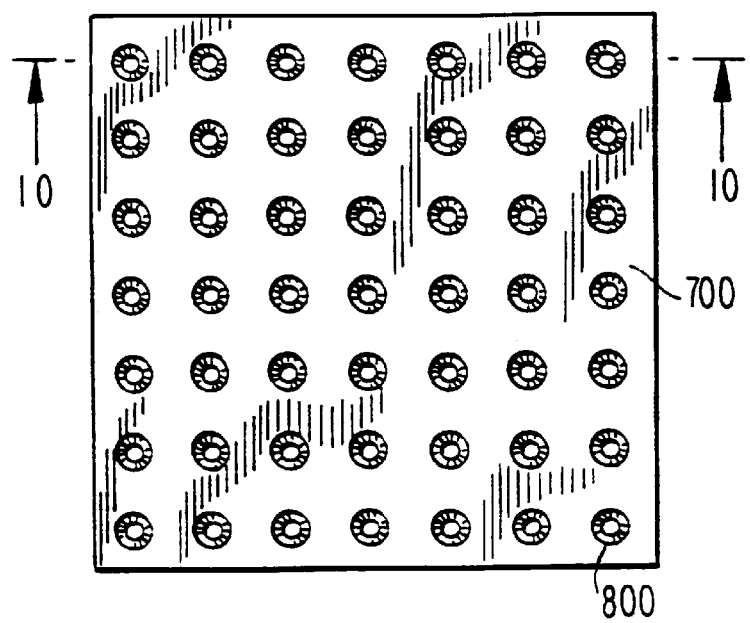
FIG. 9 is a top view of a diffusion plate constructed in accordance with an embodiment of the invention.
Figure 10:
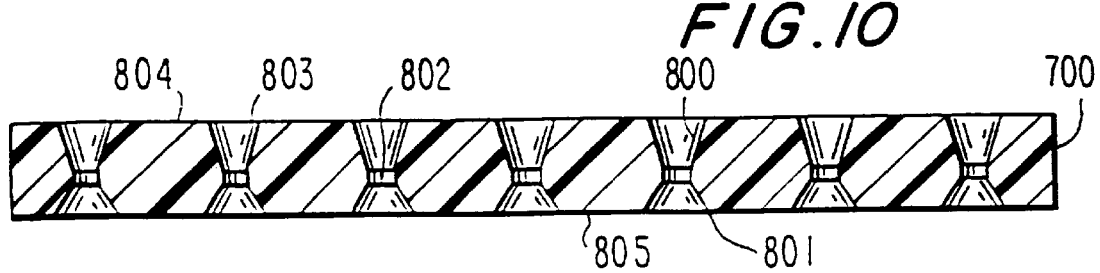
FIG. 10 is a cross sectional view of the plate of FIG. 9, taken along line 10—10.

A flow distribution plate 700, constructed in accordance with a preferred embodiment of the invention is shown in FIGS. 9 and 10. The function of plate 700 is to evenly distribute the velocity profile of the water flowing upwards through a fluidized bed column. Distribution plate 700 is also constructed to support the bed of particles and to permit the use of particles with suitably small diameters.

Distribution plate 700 is constructed with overall dimensions equal to the inside cross-sectional dimensions of the column. It is important that a tight seal exists between plate 700 and the inner walls defining the column to ensure that water does not bypass plate 700 and interfere with the flow pattern.

Distribution plate 700 includes a plurality of holes 800 formed therethrough to permit water to flow through plate 700. The walls of distribution plate 700 defining holes 800 are advantageously formed with an "hourglass" shape. The holes can include a large diameter bottom opening 801 of diameter $D_b$ at a bottom surface 805 of plate 700 and then taper inwardly to a small diameter section 802, having diameter $D_m$ and then taper outwardly to a large diameter top opening 803 having a diameter $D_t$ at the top surface 804 of plate 700, where water exits plate 700.

The "hourglass" shape provides several benefits. First, large bottom opening 801 enhances the turbulence caused by water swirling under plate 700 and therefore aids in keeping plate 700 clear of debris. The small diameter of small diameter section 802 regulates and evens the flow distribution profile across the column. Large top opening 803 helps even the flow over a larger area and reduces "jets" of water shooting from the center of small section 802. The double taper construction also helps prevent particles from falling beneath plate 700. The larger particles will accumulate at the bottom of the column and will bridge across holes 800 if the filter is turned off. The double taper also enhances the ability of particles that do fall through to be blown back above plate 700 when the system is turned on.

Plate 700 should be constructed with a thickness at least 3.5 times $D_m$, the diameter of small section 802. The number of holes 800 in plate 700 can be between about 1 to 3 times the value of: $(D_b/D_m)^2$. If the hole count is less than $(D_b/D_m)^2$, the flow rate will tend to be unduly restricted. If the hole count is greater than about 3 times that value, there will typically be too much open space in plate 700 and the resulting flow pattern is likely to be uneven. When the hole count is about 1 to 3 times $(D_b/D_m)^2$, the flow rate will not be unduly reduced, nor will the flow pattern out of plate 700 be undesirably irregular.

Holes 800 are advantageously spaced evenly across the plate in a grid pattern. The grid spacing should be approximately equal to the length of a side of plate 700, divided by the square root of from 1 to 3 times $(D_b/D_m)^2$. Alternatively, with cylindrical holes, the hole diameter is advantageously from about 0.25 to 0.75 times a side length of the plate divided by the number of holes.

Various aspects and embodiments of the invention will be illustrated in connection with the following examples. However, these examples are presented for purposes of illustration and are not intended to be construed as limiting the scope of the invention.

EXAMPLE 1

A small fluidized bed filter for use with an aquarium of up to about 40–50 gallons in capacity was formed with the following dimensions. The column had a 2" by 2" square cross section and was 10" in height. 1.8 oz. of 20/30 silica, yielding a height of 0.5" and a surface area of about 2.0 square feet was combined with 7.1 oz. of F-35 silica, which had a height of 2" and a surface area of 22 square feet. Thus, the total surface area of the particle media in the 2-inch column was 24 ft$^2$. This column was operated with water flowing upwards at a rate of about 50–80 gallons per hour. This flow rate lead to a bed expansion of approximately 200%, from 2.5" to 5.0".

The flow distribution plate (diffusion plate) was positioned about 1.5" from the bottom of the column. An inlet having an inside diameter of 0.375" entered halfway between the bottom of the column and the flow distribution plate and pointed downwards to the center bottom of the column. The bottom of the inlet port was 0.25" from the bottom of the column.

The flow distribution plate used with the small filter was a 2×2" having a 5×5 grid of holes. The overall plate thickness was 0.339". The holes were 0.422" apart and had an inner diameter between 0.093" and 0.083". The holes tapered upwards at an angle of 30° from a position 0.186" down from the top of the plate. The holes also tapered downwards at an angle of 70° from a position 0.100" up from the bottom of the plate.

To test the effectiveness of the small filter described above, the small filter was coupled to a 10 gallon aquarium having a dozen approximately 2" fish to provide a heavy bio load. Water flowing from the 10" column passed through two conventional carbon impregnated filter pads and a conventional floss pad in a filter media basket coupled to the column. Water flowed from the filter media basket back to the aquarium. The fish were fed twice daily in an amount equal to 3% of the total fish body weight.

It took approximately 14 days for the nitrogen cycle within the aquarium to begin. At that point, there was a significant increase in nitrate value, as ammonia generated by the fish was converted by the fluidized bed filter into nitrate ions. The ammonia content both in the tank and coming out of the filter was maintained at an acceptably low value and at the end of 35 days, the amount of ammonia in the aquarium was virtually zero. The expected "spikes" of ammonia values in the aquarium and coming out of the filter were relatively low and the nitrite ion concentration in the tank was also maintained at a suitably low level.

At approximately day 33, it became evident that anaerobic bacteria began to colonize oxygen depleted portions which are probably at the top of the fluidized bed and began converting nitrate ions into more simple constituents, such as nitrogen gas. Thus, the filter not only maintains low levels of ammonia and nitrites in the aquarium, it can control nitrate values as an added benefit.

EXAMPLE 2

Another fluidized bed filter was constructed with a column having a 3"×3" cross section and a height of 14". This column was filled with 4.1 oz. of 20/30 silica, which had a height of 0.5" and gave a surface area of 4.7 ft$^2$. The column also included 8.1 ozs. of F-35 silica which had a height of 1" and a surface area of 17.1 ft$^2$. The column also included 12.2 oz. of F-50 silica which had a height of 1.5" and a surface area of 38 ft$^2$, for a total of 59.8 ft$^2$ of surface area for the particulate media in the column. The column was run at over 100 gallons per hour flow rate and exhibited a bed expansion of 250%.

The flow distribution plate was positioned 1.5" from the bottom of the column and the inlet was centered and pointing downwards at the bottom of the column, below the distribution plate. The end of the inlet port was positioned 0.25" from the bottom of the column and had an inside diameter of 0.375".

The flow distribution plate was constructed with a 7 by 7 grid of holes having a maximum inner diameter of 0.093" and a minimum inside diameter of 0.83". The plate was 0.339" thick. The holes in the plate expanded downwards at an angle of 70° from a location 0.100" above the bottom of the plate and expanded outwardly at an angle of 30° from a position 0.186" below the top of the plate.

A plate having a suitable configuration, which can be used in a wide range of column cross sectional sizes can be constructed as follows. A square plate approximately 0.340" (plus or minus 0.03") having holes centered on a grid with approximate spacing of 0.422" by 0.422" ("0.005"). Holes have a bottom diameter $D_b$ at the bottom surface of the plate of approximately 0.25" and taper inwardly to a depth of approximately 0.10", at an angle of 70° (±5°). The hole then maintains a diameter $D_m$ of 0.093 to 0.082" for depth of approximately 0.050" (±0.005) and then taper outwardly to an approximately 0.18" diameter opening $(D_t)$ at the top surface of the plate at an angle of 30° (±5°) with an approximate depth of 0.19". A 2" by 2" plate would contain 25 tapered holes with a 5×5 hole layout. A 3" by 3" plate would contain 49 tapered holes with a 7×7 layout. A 6" by 6" plate would include 196 holes arranged on a 14×14 layout.

It has been determined that for aquaculture applications, approximately 900 square feet of filtration media will handle the ammonia load produced by approximately 400 to 500 pounds of fish. For commercial units, 5 grades of sand are preferable to allow for horizontal channeling, thus reducing collisions between sand particles and allowing for high fluidization of up to 500% of the original height of the unfluidized bed of particles.

EXAMPLE 3

A large commercial unit was constructed with a square 6" by 6" cross section and an overall height of 6'. The water input had an inside diameter of 0.81" and was centered at the bottom of the column, pointing downwards, ¾ of an inch from the bottom. The center line of the input was located on the side of the column, 23" from the bottom. A flow distribution plate was located 4½" from the bottom of the column and had a 14×14 pattern of 196 hourglass shaped holes, having a constricted diameter $(D_m)$ of 3/32", a top maximum diameter of 7/64" and a bottom diameter of 0.2". The holes tapered inwardly at an angle of 60° from the bottom surface $(D_b=0.20")$ and tapered inwardly from $D_t=7/64"$ at an angle of 25–30°.

EXAMPLE 4

A second similarly constructed square plate also had a 6"×6" outside diameter and a thickness of 0.339". This plate also used a 14×14 grid of holes and the holes were spaced 0.422" apart. From the bottom opening $D_i$, the holes tapered inwardly at an angle of 70° for 0.1", maintained a constricted diameter $D_m$ of 0.093" and then at a distance 0.186" from the top of the plate, tapered outwardly at an angle of 30°.

It will thus be seen that the objects set forth above, among those made apparent from the preceding description, are efficiently attained and, since certain changes may be made in carrying out the above method and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. An aquarium filter comprising:
   a housing, configured to hang on the side of an aquarium, defining a water flow path for substantially all of the water flowing through the housing through a first, a second and then a third section of the housing;
   the first section including a trap constructed to mechanically remove particles from a stream of water flowing in the flow path;
   the second section constructed to provide biological filtration for subjecting water which had been mechanically filtered in the first section to treatment by living organisms, the second section including an inlet, a support plate having holes formed therethrough located above the inlet, a bed of particles which are configured to host bacteria above the support plate and an outlet above the particles, the particles and second section being sized so that the particles can become fluidized by water flowing up through the second section; and
   the third section including a chemical filter constructed to chemically remove organic materials from the biologically treated water.

2. The aquarium filter of claim 1, wherein the mechanical filter contains a fiberous filter pad configured to be submerged within water contained within said aquarium.

3. The aquarium filter of claim 1, wherein the particles consists essentially of sand, about 90% of which is a size from sieve No. 30 to sieve No. 70.

4. The aquarium filter of claim 1, wherein the particles consists essentially of sand and sand of at least three different sieve number sizes are each included as at least 5% of the total amount of sand.

5. The aquarium filter of claim 3, wherein sand of at least three different sieve number sizes are each included as at least 5% of the total amount of sand.

6. The aquarium filter of claim 1, wherein the second section includes about 50 to 150 grams of particles.

7. The aquarium filter of claim 1, wherein the second section includes about 150–300 grams of particles.

8. The aquarium filter of claim 1, wherein the second section includes about 400–600 grams of particles.

9. The aquarium filter of claim 1, wherein the third section contains activated charcoal.

10. The aquarium filter of claim 1, wherein the first section includes a removeable filter pad and the third section includes a removeable filter pad which includes activated charcoal.

11. The aquarium filter of claim 1, wherein the first section includes a removable filter pad having a length and width substantially larger than the thickness thereof mounted on an upwardly facing louvered support and the water flow path is through the thickness of the pad and the third section includes a removable filter pad which includes activated charcoal.

12. The aquarium filter of claim 1, wherein the second section includes a column and an inlet thereto, which is constructed to direct water downwards towards the bottom of the column before it travels upwards to the top of the column.

13. The aquarium filter of claim 2, wherein the second section includes a plate having holes therethrough and a bed of particles is located above the plate.

14. The aquarium filter of claim 13, wherein the plate includes about 40–110 evenly spaced holes of inner diameter selected to substantially prevent the particles from falling therethrough.

15. The aquarium filter of claim 14, wherein the holes are arranged in a pattern selected to establish a uniform velocity profile of water flowing up through the bed of particles.

16. The aquarium filter of claim 15, wherein the holes are defined by walls which taper from a relatively large diameter opening at a surface of the plate to a more narrow opening.

17. The aquarium filter of claim 1, wherein the flow of water through the second section is about 50–200 gallons per hour.

18. An aquarium filtration system, comprising:

a housing defining at least one column, the column having an inlet substantially at the bottom thereof, a perforated particle support plate above the inlet and a bed of particles above the plate in a fluidized condition of relative motion and expanded volume, the top of the bed of particles being relatively flat and water having a relatively uniform velocity profile across the column traveling up the column.

19. The system of claim 18, including a secondary filtration compartment in fluid communication with the column for providing mechanical filtration to water from an aquarium.

20. The system of claim 18, including an additional filtration compartment for providing chemical filtration to the water from an aquarium.

21. The system of claim 18, including a chemical filter and a mechanical filter.

22. The system of claim 18, wherein the flow of water through the second section is about 60 to 165 gallons per hour.

23. The system of claim 18, wherein the particles consist essentially of sand.

24. The system of claim 23, wherein over about 75% of the sand is 40 and 50 mesh.

* * * * *